United States Patent [19]

McGinniss

[11] 4,096,105

[45] * Jun. 20, 1978

[54] AQUEOUS COATING COMPOSITION

[75] Inventor: Vincent Daniel McGinniss, Valley City, Ohio

[73] Assignee: SCM Corporation, New York, N.Y.

[*] Notice: The portion of the term of this patent subsequent to Dec. 9, 1992, has been disclaimed.

[21] Appl. No.: 689,107

[22] Filed: May 24, 1976

[51] Int. Cl.$^2$ ............................................. C25D 13/10
[52] U.S. Cl. ..................... 260/29.6 NR; 204/181 C; 260/29.2 EP; 260/29.6 HN
[58] Field of Search ................ 260/29.6 NR, 29.2 EP, 260/29.6 HN; 204/181

[56] References Cited

U.S. PATENT DOCUMENTS

| | | | |
|---|---|---|---|
| 3,619,398 | 11/1971 | Bosso et al. | 204/181 |
| 3,679,564 | 7/1972 | Dowleenko et al. | 260/29.6 HN |
| 3,925,181 | 12/1975 | McGinniss | 204/181 |
| 3,975,251 | 8/1976 | McGinniss | 204/181 |

*Primary Examiner*—Eugene C. Rzucidlo
*Attorney, Agent, or Firm*—Jerry K. Mueller, Jr.

[57] ABSTRACT

A heat-curable, aqueous coating composition comprises a polymer having pendant primary and/or secondary amine groups and a cross-linking agent having alpha-, beta-ethylenically unsaturated carbonyl groups in aqueous dispersion. The amine groups are protonated to render the polymer water dispersible. In one preferred embodiment, the coating composition is useful in cathodic electrocoating.

12 Claims, No Drawings

AQUEOUS COATING COMPOSITION

CROSS-REFERENCE TO RELATED APPLICATIONS

This application is cross-referenced to commonly assigned application of applicant U.S. Ser. No. 560,108, filed on Mar. 19, 1975, now U.S. Pat. No. 3,975,251, the disclosure of which is expressly incorporated herein by reference.

BACKGROUND OF THE INVENTION

This invention relates to water-dispersible, heat-curable polymers in aqueous coatings and more particularly to cross-linking amine groups on the polymers with heat-reactive alpha-, beta-ethylenically unsaturated carbonyl.

Applicant's copending application U.S. Ser. No. 560,108 discloses a process for cathodically electrocoating polymers having pendant amine groups and an ethylenically unsaturated carbonyl cross-linker onto a cathode substrate. It now has been discovered that the polymers having amine groups and cross-linker can form an aqueous coating composition which can be applied to substrates by conventional techniques or by cathodic electrodeposition and heat-cured.

SUMMARY OF THE INVENTION

A heat-curable coating composition in aqueous dispersion for forming a heat-curable film on a substrate, which comprises: a polymer having at least about 5% pendant primary and/or secondary amine groups, said amine groups being protonated with acid to render the polymer water dispersible and at least about 5% by weight of said polymer of an alpha-, beta-ethylenically unsaturated carbonyl cross-linking agent having at least two alpha-, beta-ethylenically unsaturated carbonyl groups.

With conventional application of the composition, the applied film is heat-curable at a temperature sufficient to volatilize the water and said acid, whereby said amine groups become deprotonated and said cross-linking agent cross-links with said deprotonated amine groups of said polymer by addition polymerization to form a heat-cured coating.

With cathodic electrodeposition of the composition, said amine groups become deprotonated upon electrodeposition of the polymer onto a cathode substrate and said cross-linking agent cross-links with said deprotonated amine groups of said polymer under heating by addition polymerization to form a heat-cured electrodeposited coating.

DETAILED DESCRIPTION OF THE INVENTION

The reaction mechanism by which cross-linking of the polymer through the unsaturated cross-linking agent occurs is an addition polymerization reaction, as more particularly described in "Organic Reactions," vol. 10 (pages 179-555), John Wiley and Sons (1959), which is incorporated expressly herein by reference. The Michael-type addition reacts a primary or secondary amine group with an alpha-, beta-ethylenically unsaturated carbonyl group in order to achieve linking of the amine group and the unsaturation of the ethylenically unsaturated carbonyl group. The alpha-, beta-ethylenic unsaturation of alpha-, beta-ethylenically unsaturated carbonyl cross-linking agent is used in the instant invention.

The polymers contain pendant primary and/or secondary amine groups. Amine groups can be attached to the polymer by reacting free carboxyl groups on a polymer (polyester, acrylic, urethane, etc.) containing available carboxyl groups which can be reacted with alkyleneimine or substituted alkyleneimine, as proposed in U.S. Pat. Nos. 3,679,564 and 3,617,453, and incorporated herein by reference. Similarly, amine groups can be introduced into the polymer by reacting pendant carboxylic acid groups on a polymer with ethylene imine or derivatives of ethylene imine. Difunctional amines also can be reacted with reactive pendant carboxyl groups on the polymer. Blocked amines also can be attached to the polymer and subsequently transformed into primary amine groups. Such blocked amine groups can be attached to epoxy resins or acrylic resins having pendant oxirane groups by reacting a ketimine blocked diethylene triamine, formed from reacting diethylene triamine with an excess of methyl ethyl ketone with the polymer. The primary and/or secondary amine groups are pendantly attached to the polymer. For purposes of this application, pendant amine groups include terminal amine groups. By pendantly attached is meant that such amine groups are attached to the polymer chain or to a side chain of the polymer. The polymer containing pendant amine groups should contain at least about 5% by weight of such pendant amine groups, and up to about 50% if desired.

Representative polymers containing pendant amine groups can be derived from epoxy and epoxy-modified diglycidyl ethers of bisphenol A structures, various aliphatic polyethylene or polypropylene glycol (diglycidyl ether) adducts, and glycidyl ethers of phenolic resins, such epoxy resins being commercially available and commonly used in the electrocoating field. Other useful polymers containing pendant amine groups include polyamide resins, for example, condensation products of dimerized fatty acids coreacted with difunctional amine, such as ethylene diamine. Polyamide resins generally are between about 500 and 5,000 molecular weight. Further useful electrocoating polymers containing pendant amine groups include acrylic resins having molecular weight of about 1,000 to about 100,000, polyester resins and polyurethane resins both having a molecular weight range of about 500 to about 5,000, vinyl resins, and amine resins.

The amine groups of the polymer are protonated with proton-donating acid to render the polymer water dispersible. Also, while the amine groups are protonated, they effectively are blocked to prevent premature linking with ethylenically unsaturated carbonyl cross-linking agent. The protonated amine groups can be deprotonated or unblocked upon electrodeposition of the polymer onto a cathode substrate or upon heating at a temperature sufficient to volatilize the acid. Often mere evaporation of the acid at room temperature is sufficient to unblock the amine groups.

The cross-linking agent is an alpha-, beta-ethylenically unsaturated carbonyl having alpha-, beta-ethylenic unsaturation capable of being heat reactive to cross-link the amine groups on the polymer. The unsaturated cross-linking agent has at least two pendantly attached alpha-, beta-ethylenically unsaturated carbonyl groups of the following structure:

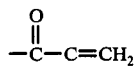

Each unsaturated carbonyl group is pendantly attached to a radical selected from the group consisting of an alkyl, an aryl, an alkyl-aryl, and polymers having a molecular weight up to about 3,000. Pendantly attached unsaturated carbonyl groups are attached to the radical chain or to a side chain of the radical.

Preferably, the unsaturated carbonyl groups are attached to an oxygen molecule and are represented by the following structure:

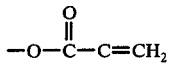

The preferred unsaturated cross-linking agent then is a multi-acrylate having at least diacrylic unsaturation. Specific preferred cross-linking agents which are particularly suited to the precepts of this invention can be selected from the group consisting of: ethylene glycol diacrylate, ethylene glycol dimethacrylate, 1,3-butylene glycol dimethacrylate, bisphenol A .imethacrylate, diethylene glycol diacrylate, pentaerythritol triacrylate, pentaerythritol tetraacrylate, trimethylolpropane triacrylate, triethylene glycol dimethacrylate, tetraethylene glycol dimethacrylate, tetraethylene glycol diacrylate, 1,6-hexanedioldiacrylate, melamine acrylate, ethoxylated bisphenol A dimethacrylate, pentaerythritol tetramethacrylate, and polyethylene glycol dimethacrylate.

The preferred unsaturated cross-linking agents can be synthesized by various methods, such as reacting hydroxyl-containing compounds with acrylyl chlorides or methacrylyl chlorides, direct esterification of hydroxyl-containing compounds with ethylmethacrylate, methylmethacrylate, and the like. The preferred unsaturated cross-linking agents also can be produced by the transesterification of esters or polyesters with 2-hydroxyethylacrylate, 2-hydroxyethylmethacrylate, hydroxypropylmethacrylate, and the like. The preferred unsaturated cross-linking agents can be produced additionally by reacting diisocyanates, polyisocyanates, or isocyanate-terminated polymers and prepolymers with hydroxyl-containing acrylic and methacrylic esters such as, for example, 2-hydroxyethylacrylate or hydroxypropylmethacrylate; by reacting epoxy polymers with acrylic acids or methacrylic acids; and by reacting carboxyl containing compounds with glycidyl acrylates or glycidyl methacrylates. Other useful cross-linking agnets include acrylamides, vinyl ketones, and the like.

In practicing this invention, the polymer is rendered water dispersible by adding sufficient proton-donating acid to completely neutralize the polymer. Appropriate acids are, for example, proton-donating acids such as phosphoric, sulfuric, hydrochloric, acetic, formic, lactic, and other organic and inorganic acids. Protonation or blocking of the amine groups serves both to water disperse the polymer and prevent premature linking of the amine groups with the cross-linker in the aqueous bath. Also, when the present composition is utilized for cathodic electrocoating operations, the protonation of the amine groups renders the polymer positively charged so that the polymer can migrate to the cathode substrate and be deposited thereon during the electrodeposition operation.

The neutralized polymer is blended with at least about 5% of the ethylenically unsaturated carbonyl cross-linking agent by weight of the polymer and up to about 50% if desired. The blend then is dispersed in water at from about 5 to about 50% or greater nonvolatile (solids) dispersion with about 5% to about 20% being preferred for an electrocoating bath of the composition. The aqueous coating composition generally is about 60° to about 125° F., with about 70° to about 95° F. being preferred for electrocoating use of the composition.

The aqueous coating composition can be applied by conventional techniques such as, for example, brushing, rolling, spraying, dipping, and the like. The coating then is heated to a temperature sufficient to volatilize the acid and water. While mere evaporation of the acid and water at room temperature can be practiced, preferably the coating is subjected to moderate heating of from about 100° F. to about 400° F. for about 5 to about 40 minutes. Such heating causes deprotonation or unblocking of the protonated amine groups of the polymer and the resulting deprotonated amine readily reacts with the cross-linker to cure the coating.

When the present composition is to be used as a cathodic electrocoating composition, the cathode substrate to be electrocoated is then immersed in the electrocoating bath while an electric potential is maintained therethrough as disclosed in U.S. Pat. No. 3,619,398, the same being incorporated herein by reference. During electrodeposition the positively charged polymer along with the unsaturated cross-linking agent migrate to the cathode substrate. The protonated amine groups of the polymer become deprotonated (lose protons) due to the electric potential applied. The polymer and said unsaturated cross-linking agent are codeposited on the cathode substrate. The electric potential applied to the bath is generally between about 20 and about 500 volts, with about 50 to 300 volts being preferred.

The coated substrate is removed from the bath, washed with water to remove excess coating, and then conventionally heat-cured at a temperature of at least about 100°, and preferably between about 200° and 400° F. for about 5 to about 40 minutes. The polymer cross-links through the deprotonated pendant primary and/or secondary amine groups attached to the electrocoated polymer. Water solubility and cross-linking of the polymer both occur through the same pendant amine groups of the polymer. The alpha-, beta-ethylenic unsaturation of the unsaturated cross-linking agent is heat-reactive under the conditions of curing and readily reacts with the pendant amine groups of the polymer in Michael-type addition reaction or addition polymerization. Upon such heating a fully cured electrodeposited coating coats the cathode substrate.

The coating composition can contain opacifying pigments and inert extenders such as, for example, titanium dioxide, zinc oxide, clays such as kaolinite clays, silica, talc, and the like. The substrate can be metal, wood, fiber board, or the like. In electrocoating uses of the composition, the cathode substrate is an electrically conductive metal such as iron, steel, aluminum, copper, galvanized steel, zinc, and the like. The cathode substrate can be in the shape of bars, sheets, irregularly shaped forms with rounded or sharp edges, and like shapes.

The following examples further detail the unsaturated cross-linking agents of the instant invention and show how the instant invention can be practiced, but should not be construed as limiting the invention. In the specification all parts are by weight, all percentages are weight percentages, and all temperatures are in degrees Fahrenheit unless otherwise expressly indicated.

Examples 1-3 show the use of the present coating composition in conventional fashion with application of the coating composition by spraying, rolling, and the like. Examples 4-12 show the use of the present coating composition in cathodic electrocoating as practiced in U.S. Ser. No. 560,108.

EXAMPLE 1

One mole of DER 332 epoxy resin (Dow Epoxy Resin, epoxide equivalent weight of 172-196, Dow Chemical Company) was reacted with 2 moles of a ketimine blocked diethylene-triamine adduct in 2-butoxy ethanol-1 solvent at room temperature for 1 hour followed by heating at 40°-50° C for 2 hours. The ketimine blocked diethylene-triamine adduct was made by the reaction of an excess of methyl ethyl ketone with 2 moles of diethylene triamine with the removal of the water of reaction and excess methyl ethyl ketone.

The epoxy-amine blocked adduct was completely neutralized with acetic acid and blended with melamine acrylate-pentaerythritoltriacrylate cross-linking agent (1:1 weight ratio) to form an equal weight mixture of the epoxy polymer and cross-linking agent. This mixture then was added to water to form a 20% non-volatile dispersion and the resulting aqueous coating composition sprayed onto a steel panel.

The coating on the panel was cured by permitting the coated panel to stand at room temperature for 24 hours. The water and acid in the applied coating on the panel evaporated during such standing and the coating cured to a fully cured, hard, excellent solvent-resistant film on the panel. Testing of the coated panel after only 2 hours revealed that the coating was tacky, indicating that partial curing the coating had occurred. Alternatively, the coating could be cured by baking at 300° F. for 30 minutes.

EXAMPLE 2

Twenty grams of diethylenetriamine was acidified with acetic acid and dispersed into 200 grams of water to which was added 100 grams of an equal weight mixture of DER 332-diacrylate (reaction product of DER 332 epoxy resin with 2 moles of acrylic acid) and melamine acrylate (cross-linking agent). The resulting aqueous coating composition was applied to a steel panel by dipping the panel into the aqueous coating composition and the resulting film cured by air drying at room temperature for 24 hours. A fully cured film with excellent solvent resistance covered the panel at the end of such time period.

EXAMPLE 3

The procedure of Example 2 repeated except that the cross-linking agent was an equal weight mixture of trimethylolpropane triacrylate and N,N-methylene-bis-acrylamide. The applied film of this aqueous coating composition was cured by heating at 300° F. for 35 minutes.

EXAMPLE 4

One mole of DER 332 epoxy resin (Dow Epoxy Resin, epoxide equivalent weight 172-196, Dow Chemical Company) was reacted with 2 moles of cyclohexyl amine in butyl cellosolve in order to attach pendant amine groups to the epoxy resin. The resin was completely neutralized with 2 moles of acetic acid. The unsaturated cross-linking agent was pentaerythritoltetraacrylate. The resin was blended with 100 grams of the pentaerythritoltetraacrylate cross-linking agent and added to water to form a 7% non-volatile dispersion.

A steel panel was immersed in the bath as the cathode and the electrocoating composition was electrode-posited therein at 50 volts for 2 minutes to form a coating of 0.4 mil. The coated panel was removed from the bath, washed with water, and baked at 360° F. for 15 minutes. A solvent-resistant coating covered the panel indicating that curing had taken place.

EXAMPLE 5

A polyester resin was prepared by reacting one mole of phthalic anhydride, 1 mole of succinic anhydride, and 1 mole of propylene glycol. Such reaction was carried out in toluene with azeotropic distillation of water. This reaction product, an acid-terminated polyester, then was reacted with 2 moles of hexamethylene diamine and the water removed to form a diamine-terminated polyester resin.

The amine resin next was completely neutralized with 6 moles of acetic acid and blended with 20% by weight of melamine acrylate cross-linking agent. The blend was added to demineralized water to form a 10% non-volatile dispersion. A steel panel then was cathodically electrocoated in the electrocoating bath to form a 0.8 mil coating, washed with water, and baked at 250° F. for 40 minutes. Again, a fully cured electrodeposited coating covered the panel.

EXAMPLE 6

A polyamide resin was formulated by reacting 1 mole of succinic anhydride with 2 moles of hexamethylene diamine in toluene with removal of water by azeotropic distillation.

The diamine resin then was completely neutralized with 2.5 moles of acetic acid. The neutralized polymer was blended with 20% by weight of the diacrylate of DER 332 epoxy resin unsaturated cross-linking agent and this blend added to water to form a 10% non-volatile dispersion. A steel panel was cathodically electrocoated to 0.6 mil, washed with water and baked at 360° F. for 30 minutes. A fully cured electrodeposited coating covered the panel upon such baking.

EXAMPLE 7

One mole of an epoxy resin (DER 664, epoxy equivalent weight of 900, Dow Epoxy Resin, Dow Chemical Company) was reacted at 60° C. with 2 moles of the ketimine blocked diethylene triamine of the specification,

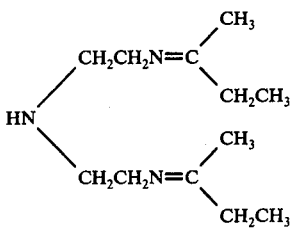

completely neutralized with 4 moles of lactic acid, and blended with 20% of 1,6-hexanedioldiacrylate cross-linking agent. The blend was then added to deionized water to form a 7% non-volatile (solids) dispersion.

This electrocoating composition was cathodically electrodeposited at 100 volts for 1 minute onto steel panels to 1.0 mil. The panels then were removed from the bath, washed with water, and baked at 300° F. for 30 minutes. A hard, flexible, solvent-resistant coating covered the steel panel.

EXAMPLE 8

The procedure of Example 7 was followed except that the 1,6 hexanedioldiacrylate was omitted from the blend. The electrocoated steel panels upon baking did not have a solvent-resistant coating thereon, indicating that the electrocoating had not cured.

EXAMPLE 9

An acrylic resin was synthesized by the solution polymerization of 30% ethylacrylate, 20% styrene, 30% butyl acrylate, and 20% glycidyl methacrylate. This reaction was run under standard solution acrylic polymerization conditions using 2-butoxy ethanol-1 as the solvent and azobisisobutyl nitrile as the initiator.

The solution acrylic polymer contained pendant oxirane groups. The solution acrylic polymer was reacted with 15% of the ketimine blocked diethylene triamine of Example 7 to form an acrylic resin with pendant amine groups.

The amine-acrylic resin then was completely neutralized with 4 moles of lactic acid, blended with 20% trimethylolpropane triacrylate cross-linking agent and added to water to form an 8% non-volatile dispersion.

This electrocoating composition was cathodically electrodeposited onto steel panels to 0.4 mil in a manner similar to Example 7, washed with water, and baked at 400° F. for 25 minutes. A hard, flexible, fully cured, solvent-resistant coating covered the panels.

EXAMPLE 10

A urethane resin was synthesized from the reaction of 2 moles of toluenediisocyanate and 1 mole of ethylene glycol. The diisocyanate-terminated resin was then reacted with 2 moles of the ketimine blocked diethylene triamine of Example 7. The amine resin was completely neutralized with 4 moles lactic acid and blended with 15% of the reaction product of 1 mole of toluenediisocyanate with 2 moles of 2-hydroxyethylacrylate (unsaturated cross-linking agent). The electrocoating bath was formed by adding the resin and said unsaturated cross-linking agent to water to form an 8% non-volatile dispersion.

The blend was cathodically electrodeposited onto a steel panel at 100 volts for 2 minutes to 1.0 mils. The steel panel was then removed from the bath, washed with water, and baked at 400° F. for 10 minutes. A fully cured electrodeposited coating covered the panel.

EXAMPLE 11

A polymer-diacrylate cross-linking agent was prepared by reacting 2 moles of succinic anhydride with 1 mole of polyoxyethylene glycol (molecular weight of 1540), which reaction product was further reacted with 2 moles of glycidyl acrylate.

One mole of the epoxy resin of Example 7 (DER 664) was reacted at 60° C. with 2 moles of the ketimine blocked diethylene triamine of Example 7 followed by further reaction with one mole of linseed oil fatty acid. This resin was completely neutralized with 4 moles of acetic acid and blended with 50% polyetherdiacrylate cross-linking agent by weight of the resin. The blend was added to deionized water to form an 8% non-volatile dispersion.

This electrocoating composition was cathodically electrodeposited at 100 volts for 1 minute onto a steel panel to 0.6 mils. The panel was removed from the bath, washed with water, and baked at 400° F. for 35 minutes. A hard, flexible, solvent-resistant coating covered the panel.

EXAMPLE 12

The neutralized resin of Example 11 (unsaturated oil-modified epoxy resin neutralized with acetic acid) was blended with 20% by weight unsaturated cross-linking agent produced by the transesterification of dimethylterephthalate with excess 2-hydroxyethyl acrylate. The blend was added to deionized water to form an 8% non-volatile dispersion.

This electrocoating cmposition was cathodically electrocoated to 0.4 mil and baked in a manner similar to Example 11. A hard, flexible, solvent-resistant coating covered the panel.

Alternatively, any of the cathodic electrocoating compositions shown in Examples 4–12 can be applied by conventional techniques to a substrate and heat-cured in accordance with the precepts of this invention.

I claim:
1. A coating composition in aqueous dispersion for forming a heat-curable film thereof on a substrate comprising:
   a polymer having at least about 5% by weight pendant primary and/or secondary amine groups, said amine groups being protonated with acid to render said polymer water dispersible; and
   at least about 5% by weight of said polymer of an alpha-, beta-ethylenically unsaturated carbonyl cross-linking agent having at least two alpha-, beta-ethylenically unsaturated carbonyl groups,
said film of said coating composition being heat-curable at a temperature sufficient to volatilize the water and said acid in said film, whereby said protonated amine groups become deprotonated and said cross-linking agent cross-linking said polymer through said deprotonated amine groups by addition polymerization to form a heat-cured film on said substrate.

2. The coating composition of claim 1 wherein said cross-linking agent is an acrylate cross-linking agent having at least two acrylate groups.

3. The coating composition of claim 1 wherein said cross-linking agent is an acrylamide cross-linking agent having at least two acrylamide groups.

4. The coating composition of claim 1 wherein said film on said substrate is curable at temperatures of at least about 100° F.

5. A substrate having thereon a heat-curable film of the coating composition of claim 1.

6. A substrate having thereon a heat-cured film of the coating composition of claim 1.

7. A cathodic electrocoating composition dispersed in an aqueous electrocoating bath for electrodeposition onto a cathode substrate disposed within said bath for forming a heat-curable cathodic electrodeposited coating on said cathode substrate, comprising:

an electrocoating polymer having at least about 5% by weight pendant primary and/or secondary groups, said amine groups being protonated with acid to render said polymer water dispersible in said bath; and at least about 5% by weight of said polymer of an alpha-, beta-ethylenically unsaturated carbonyl cross-linking agent having at least two alpha-, beta-ethylenically unsaturated carbonyl groups, said protonated amine groups adapted to become deprotonated upon electrodeposition of said polymer onto said cathode substrate, said cross-linking agent cross-linking said polymer through said deprotonated amine groups by addition polymerization to form a heat-cured electrodeposited coating on said cathode substrate.

8. The cathodic electrocoating composition of claim 7 wherein said cross-linking agent is an acrylate cross-linking agent having at least two acrylate groups.

9. The cathodic electrocoating composition of claim 7 wherein said cross-linking agent is an acrylamide cross-linking agent having at least two acrylamide groups.

10. The cathodic electrocoating composition of claim 7 wherein said film on said substrate is curable at temperatures of at least about 100° F.

11. A cathode substrate having thereon a heat-curable electrodeposited coating of the cathodic electrocoating composition of claim 7.

12. A cathode substrate having thereon a heat-cured electrodeposited coating of the cathodic electrocoating composition of claim 7.

* * * * *

UNITED STATES PATENT AND TRADEMARK OFFICE
CERTIFICATE OF CORRECTION

PATENT NO. : 4,096,105
DATED : June 20, 1978
INVENTOR(S) : Vincent Daniel McGinniss It is certified that error appears in the above-identified patent and that said Letters Patent are hereby corrected as shown below:

Col. 3, line 26, change ".imethacrylate" to -- dimethacrylate --. Col. 8, line 35, change "cmposition" to -- composition --. Col. 9, line 16, before the first "groups" insert -- amine --.

Signed and Sealed this

Twenty-first Day of November 1978

[SEAL]

Attest:

RUTH C. MASON
*Attesting Officer*

DONALD W. BANNER
*Commissioner of Patents and Trademarks*